US007292743B1

(12) United States Patent
Giotto et al.

(10) Patent No.: US 7,292,743 B1
(45) Date of Patent: Nov. 6, 2007

(54) PORTABLE OPTICAL INTRUSION DETECTION SYSTEM

(76) Inventors: Frank Giotto, 161 Clear Rd., Oriskang, NY (US) 13424; Arthur Brown, 161 Clear Rd., Oriskang, NY (US) 13424

( * ) Notice: Subject to any disclaimer, the term of this patent is extended or adjusted under 35 U.S.C. 154(b) by 0 days.

(21) Appl. No.: 11/413,893

(22) Filed: May 1, 2006

(51) Int. Cl.
*G02B 6/00* (2006.01)

(52) U.S. Cl. ........................................ 385/13; 340/555

(58) Field of Classification Search .................. 385/13; 340/555–557
See application file for complete search history.

(56) References Cited

U.S. PATENT DOCUMENTS 5,434,557 A * 7/1995 Alizi .......................... 340/555
5,578,990 A * 11/1996 Sanford et al. ............. 340/541

* cited by examiner

*Primary Examiner*—Sarah Song
(74) *Attorney, Agent, or Firm*—David Giglio

(57) ABSTRACT

There is provided a portable fiber optic cable based intrusion detection system in which support posts are driven into the earth to define a perimeter. A portably mountable fiber optic cable attenuator is installed to each support post. The fiber optic cable is wrapped around a first compressible member of the attenuator and then looped through a second compressible member. A retractable rod having a cross arm there through is elevated through the second compressible member to form an upper loop in fiber optic cable. The retractable rod is then retracted leaving the remaining upper loop. An external force on the fiber optic cable diminishes the upper loop about the cross arm thereby creating a microbend in the fiber optic cable. A light detector senses a reduced light intensity, caused by the microbend, at the end of the fiber optic cable which triggers an alarm.

15 Claims, 8 Drawing Sheets

PORTABLE OPTICAL INTRUSION DETECTION SYSTEM

FIELD OF THE INVENTION

The present invention relates generally to electronic intrusion detection systems and, more particularly, to a fiber optic cable attenuator.

BACKGROUND OF THE INVENTION

There are many electronic intrusion detection systems which employ a fiber optic cable as a sensor. Typically, mechanical attenuators respond to an external force on the fiber optic cable to produce a microbend in the fiber optic cable. A light signal passing through the fiber optic cable from a first cable end responds to the microbend in two ways.

In the first fashion, the microbend causes the light intensity to diminish at a second cable end which is readily detected by a light detector. Thus, when the light intensity received at the second cable falls below a predetermined threshold level an alarm signal is generated.

The second way that the light signal is affected by the microbend is that there is an increase in back scattered light. Using an optical time domain reflectometer, the location of the microbend along the cable length is readily determined.

There are several problems with the electronic intrusion detection systems of the prior art. First, of those devices in the prior art, all are designed as permanent installations about a fence or other permanent type structure. Thus, the attenuators are expensive to make and expensive to install. Further, once they are installed to the fence, they are not suitable for quick removal and relocation.

One example of this type of attenuator is described in U.S. patent application Ser. No. 10/141,402 which teaches a spring loaded mechanical attenuator which is installed at various points along a fence. These complicated attenuators must be installed and maintained by competent installation and maintenance personnel. Further, when these attenuators are tripped they must be reset which is a time consuming process and requires knowledge of the inner workings of the attenuators.

SUMMARY AND OBJECTS OF THE PRESENT INVENTION

It is object of the present invention to improve the art of electronic intrusion detection devices.

It is another object of the present invention to provide a portable cable attenuator which is quickly installed and requires simple maintenance.

It is yet another object of the present invention to provide a portable cable attenuator which operates in conjunction with a fiber optic cable, a light source, a light detector and an alarm signal to provide an electronic intrusion detection apparatus.

It is still another object of the present invention to provide an electronic intrusion detection apparatus that is quickly installed about a perimeter and does not require a fence or other perimeter barrier device.

These and other objects are provided in accordance with present invention in which there is provided a portable optical intrusion detection apparatus for detecting perimeter intrusion, which includes a light source for transmitting a light signal, a fiber optic cable optically connected at a first end to the light source, at least one portably mounted cable attenuator, a light detector means receives and measures the intensity of the light signal at a second end of the fiber optic cable and an alarm which is responsive to the light detector which provides a detectable signal when the intensity of the light signal falls below a predetermined threshold level.

The attenuator includes a first cable looping means which forms a first cable loop in the fiber optic cable, an upper cable loop setting means which forms an upper cable loop in the fiber optic cable adjacent to the first cable loop, wherein the upper cable loop has a first sized set dimension, a cable loop stopping means which defines a predetermined minimum sized upper cable loop when fiber optic cable is subject to an external force, wherein the predetermined minimum sized upper cable loop is smaller dimensioned than the first sized set dimension upper cable loop, and attenuator securing means for securing said at least one cable attenuator to a fixed structure.

Typically, the attenuator is affixed to a fixed structure such as a support post, which is anchored in the earth.

The first cable looping means includes an adjustable tensioner which allows the capability of adjusting the frictional force on the fiber optic cable to adjust the sensitivity of the detection apparatus.

The adjustable tensioner further includes a compressible member, wherein the fiber optic cable loops about the compressible member, and wherein the compressible member includes a coefficient of friction that varies with the compression of the compressible member.

The cable loop setting means further includes a retractable rod having a cross arm affixed thereto, wherein the upper cable loop is formed around the cross arm, such that the upper cable loop has a first sized dimension when the retractable rod is in an extended position.

The cable loop stopping means further includes the retractable rod and cross arm in a retracted position.

Trip wires are affixed to the fiber optic cable to increase detection coverage about a perimeter.

DRAWINGS OF THE PRESENT INVENTION

The present invention will be understood and appreciated more fully from the following detailed description taken in conjunction with the drawings in which.

DETAILED DESCRIPTION OF THE PRESENT INVENTION

Figure 1:
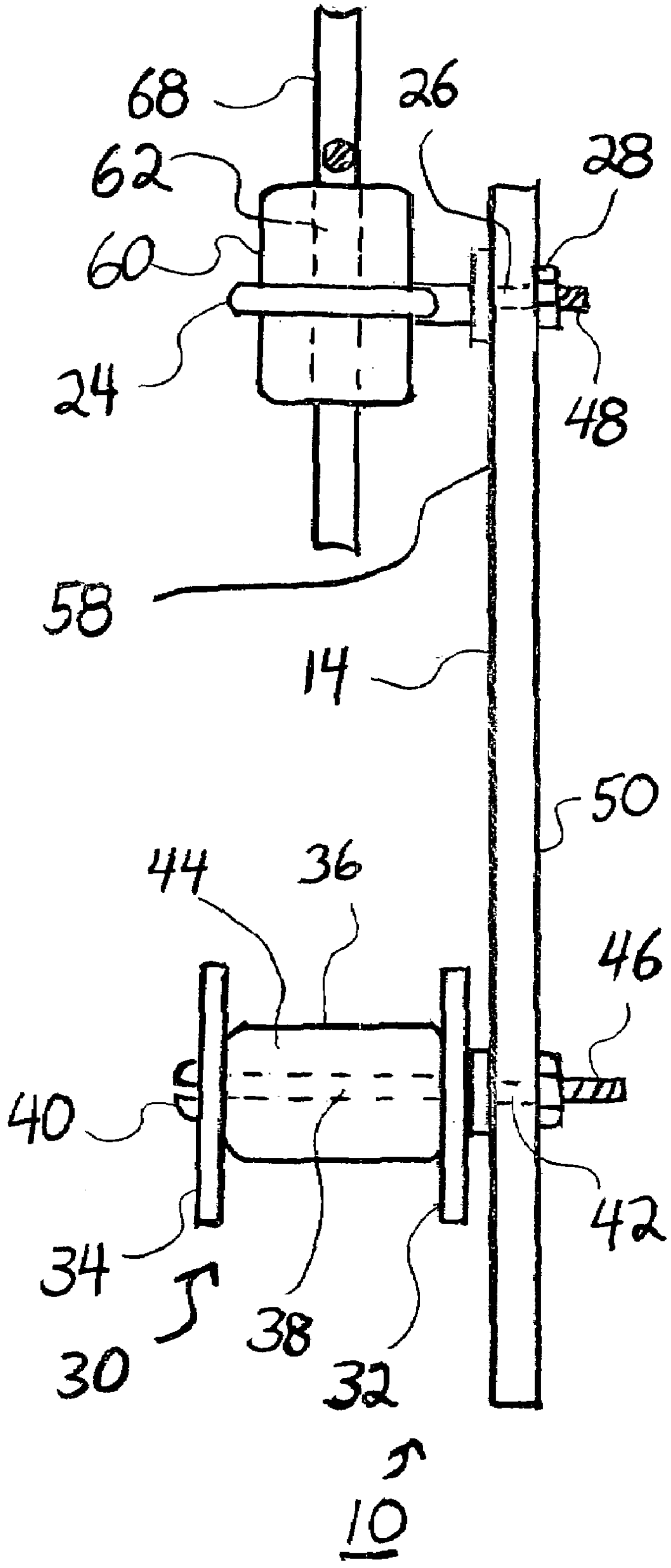
FIG. 1 is a side elevation view of a fiber optic cable based attenuator in accordance with a preferred embodiment of the present invention.
Figure 2:
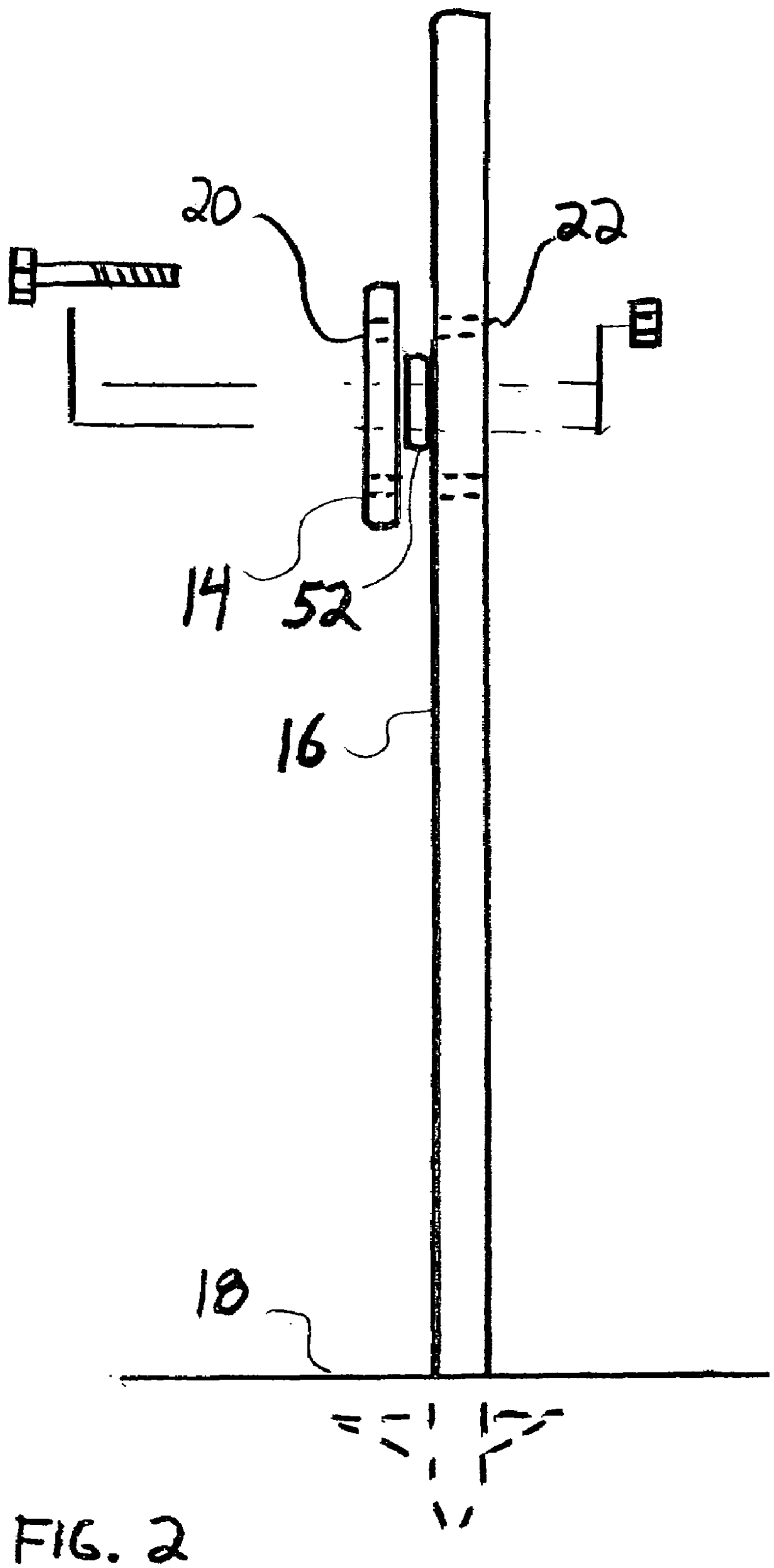
FIG. 2 is a side elevation view showing fabrication of a straight bracket to a support post in accordance with a preferred embodiment of the present invention.
Figure 3:
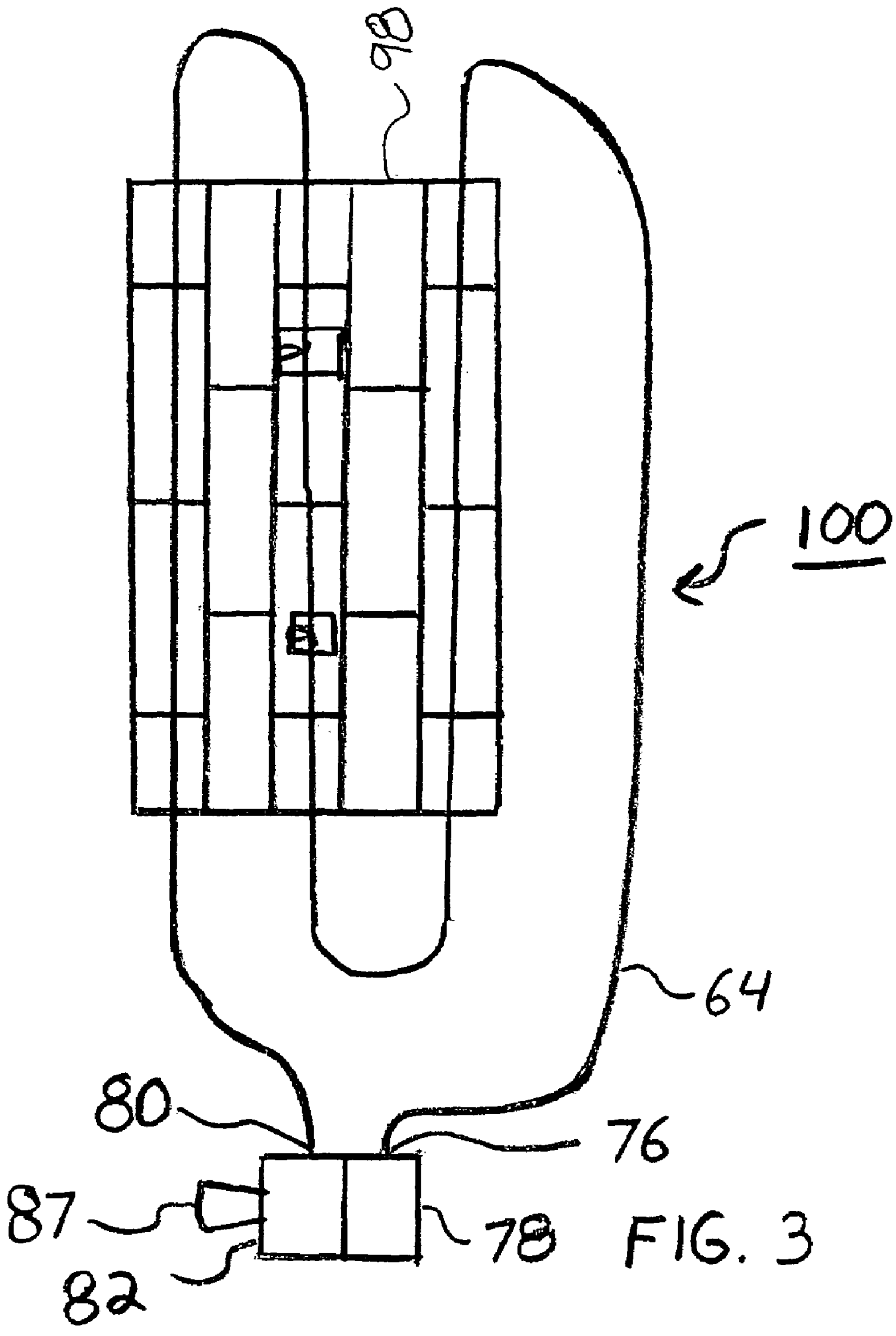
FIG. 3 is a block diagram view a fiber optic cable based intrusion detection system of the present invention in operation with a brick wall.
Figure 4:
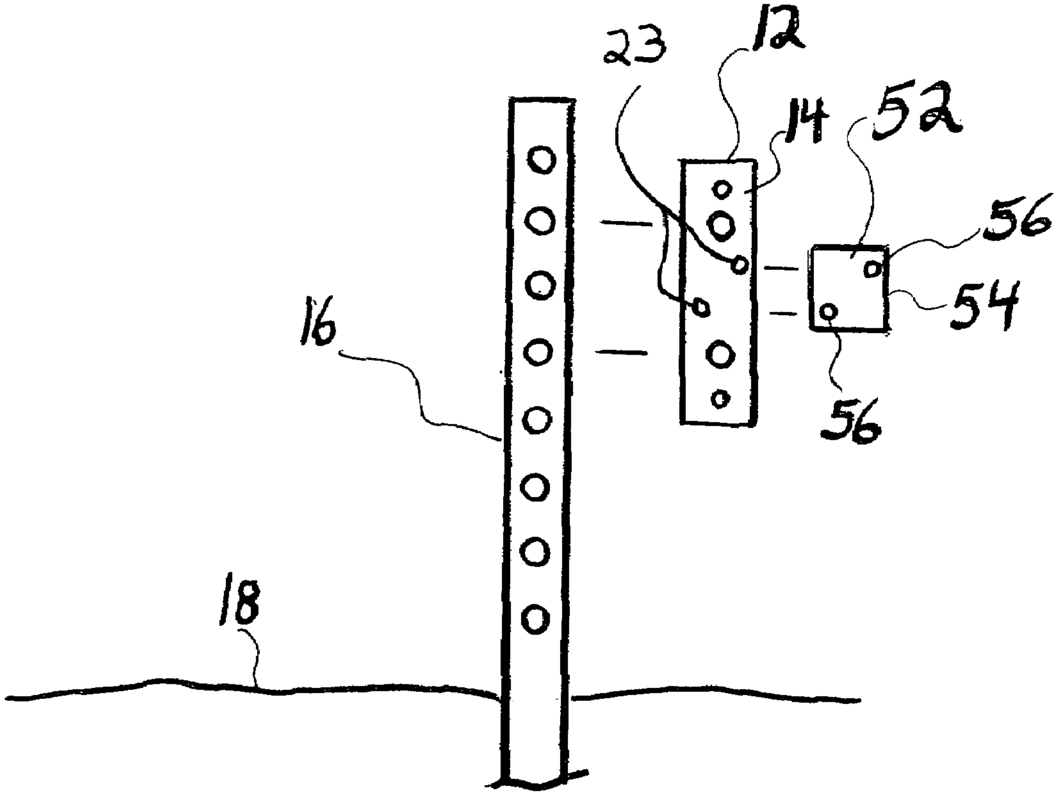
FIG. 4 is a front elevation view of the straight bracket and support post of FIG. 2 in which a spacer is provided for clearance purposes.

Referring now to FIG. 1, there is shown a portably mountable fiber optic cable attenuator 10 in which a substrate 12 comprises a straight bracket 14. The substrate 12 can be made of any suitable rigid material. A light weight material such as aluminum is preferred because it is lightweight and thus easier to manipulate, which includes drilling holes there through or shaping. Referring to FIG. 1, a support post 16 is driven into the earth 18 by any means, including by striking with a hammer. The straight bracket 14 is secured to the support post 16 via prefabricated openings 20 in the straight bracket 14 which align with prefabricated openings 22 through the support post 16. The prefabricated openings 22 of the support post 16 allows for height adjustment of the straight bracket 14.

Prior to securing the straight bracket 14 to the support post 16, a threaded eye bolt 24 is secured through an prefabricated upper opening 26 in the straight bracket 14. The upper opening 26 may be threaded to accommodate the threaded eye bolt 24 or the threaded eye bolt 24 may be secured using a nut 28.

Other hardware and securing apparatus are used to install the bracket 14 to natural structures, such as trees, or artificial structures such as buildings or walls. It should also be apparent that bracket 14 may be angled to provide certain clearances or to accommodate to shaped structure.

Further fabrication of the attenuator 10 is required prior to installing the bracket 14 to the support post 16. A cable tensioning member 30 includes an interior washer 32 and an exterior washer 34 separated by a first compressible member 36 having an opening 38 there through. A bolt 40 fits through both washers 32, 34 and is secured through prefabricated lower opening 42 in the straight bracket 14.

The first compressible member 36 is a cylindrically shaped foamy material having the opening 38 disposed through its central axis. In a preferred embodiment, the first compressible member 36 has a twenty five millimeter diameter and a thirty millimeter length in a non-deformed state and is manufactured under the trademark foamies® by Darice® Inc. of Strongsville, Ohio.

When the bolt 40 is tightened the exterior washer 34 moves inward, thus compressing the first compressible member 36. As the first compressible member 36 compresses, its exterior surface 44 becomes less porous and thus contains a lower coefficient of friction than a non-compressed first compressible member 36, which feature will become important upon a further reading of the present invention.

At this point, the straight bracket 14 could be mounted to the support post 16. However, the threaded portions 46, 48 of the bolt 40 and eye bolt 24 respectively extend beyond the rear surface 50 of the support bracket 14 and create an obstacle for securing the straight bracket 14 to the support post 16.

A spacer 52, typically comprised of a rectangular plate 54 includes prefabricated openings 56 which aligns with the prefabricated openings 20 in the straight bracket 14. The spacer 52 is now secured to the rear surface 50 of the straight bracket 14, thus providing clearance for properly securing the straight bracket 14 to the support post 16.

Moving now towards the upper portion 58 of the bracket 14, a second compressible member 60, substantially similar to the first compressible member 36 includes an opening 62 there through, the importance of which shall be described herein.

A fiber optic cable 64 is wound around the first compressible member 36 in which a large loop 66 is retained in the cable. This large loop 66 is passed through the opening 62 in the second compressible member 60.

A retractable rod 68 having a cross arm 70 disposed there through fits through the opening 62 as well. The fiber optic cable loop 66 is now wrapper over the top of the retractable rod 68 and around the cross arm 70.

Figure 5:
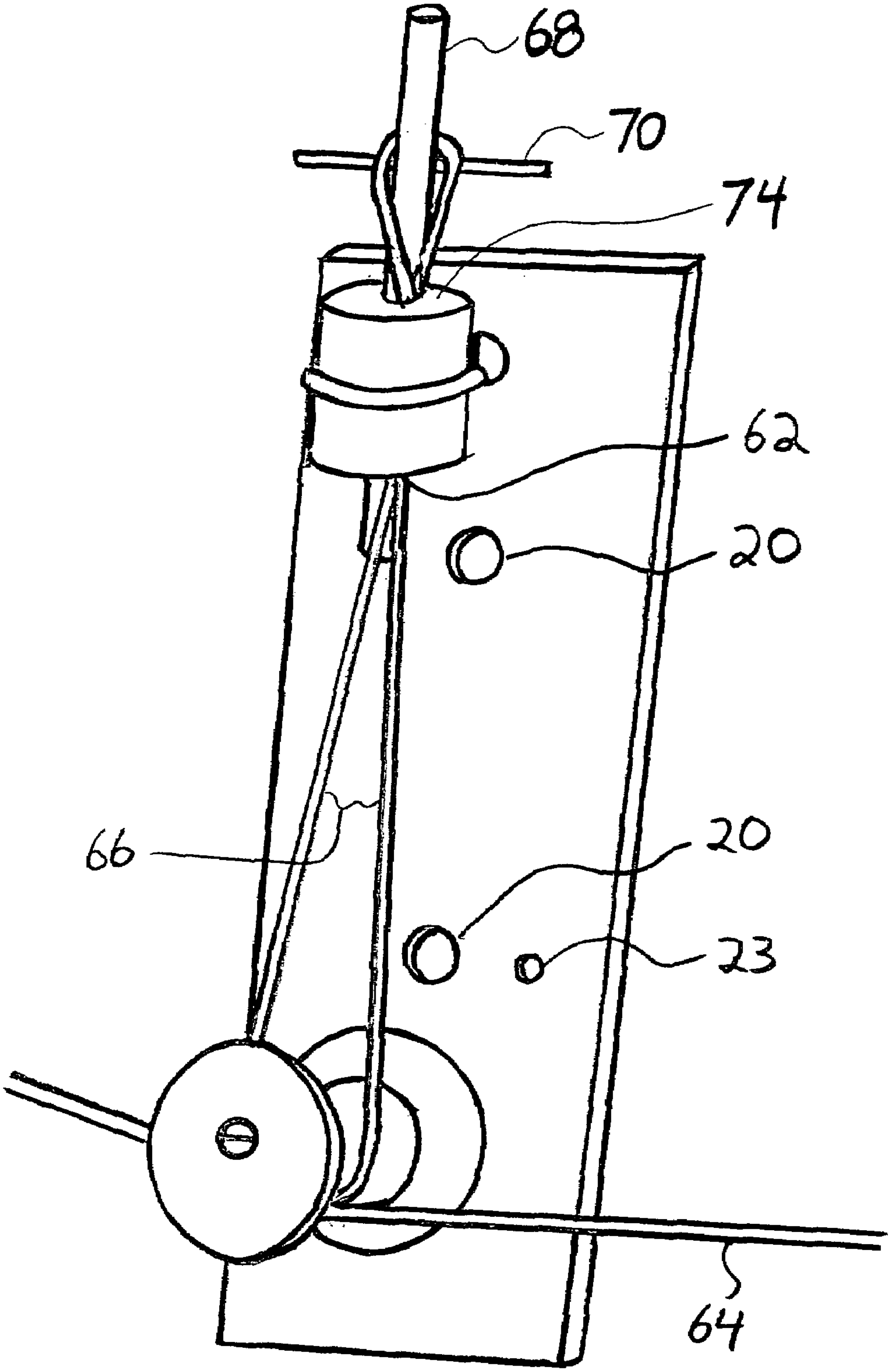
FIG. 5 is a front perspective view of the attenuator of FIG. 1 in which an upper loop in the fiber optic cable is being formed.
Figure 6:
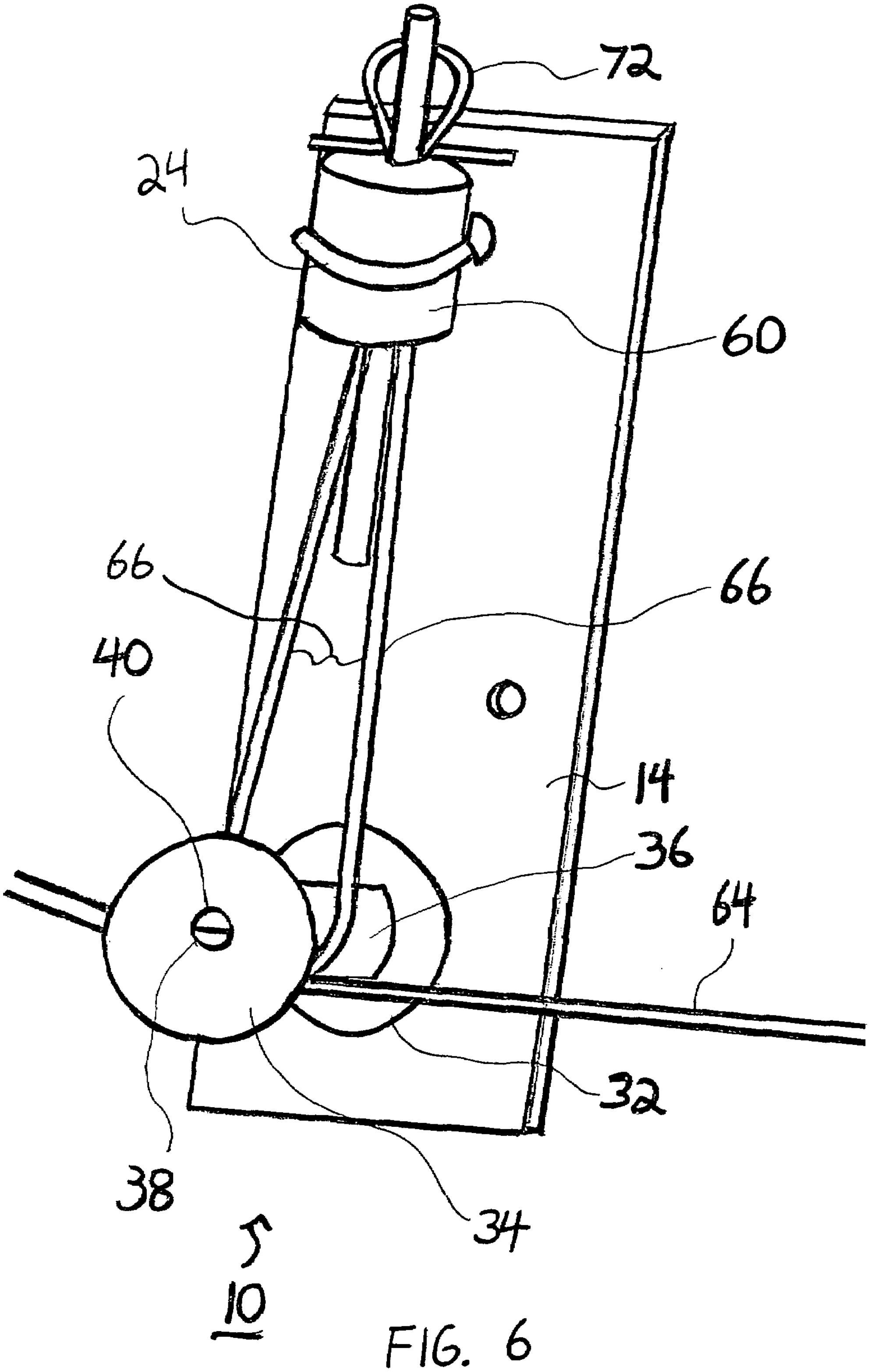
FIG. 6 is a front perspective view of the attenuator of FIG. 5 in which the upper loop is set and ready for detection.

At this point the second compressible member 60 is gently squeezed inside of the eye bolt 24. The retractable rod 68 is raised to produce an upper loop 72 in the fiber optic cable 64, depicted in FIG. 5. Next, the retractable rod 68 is lowered so that the cross arm 70 contacts an upper surface 74 of the second compressible member 60, still leaving the upper loop 72 in the fiber optic cable, depicted in FIG. 6.

The fiber optic cable 64 includes a first end 76 which is optically connected with a light source 78. A second end 80 of the fiber optic cable 64 is connected to a light detector 82. Thus, a predetermined measured light intensity is received at the second cable end 80.

Figure 7:
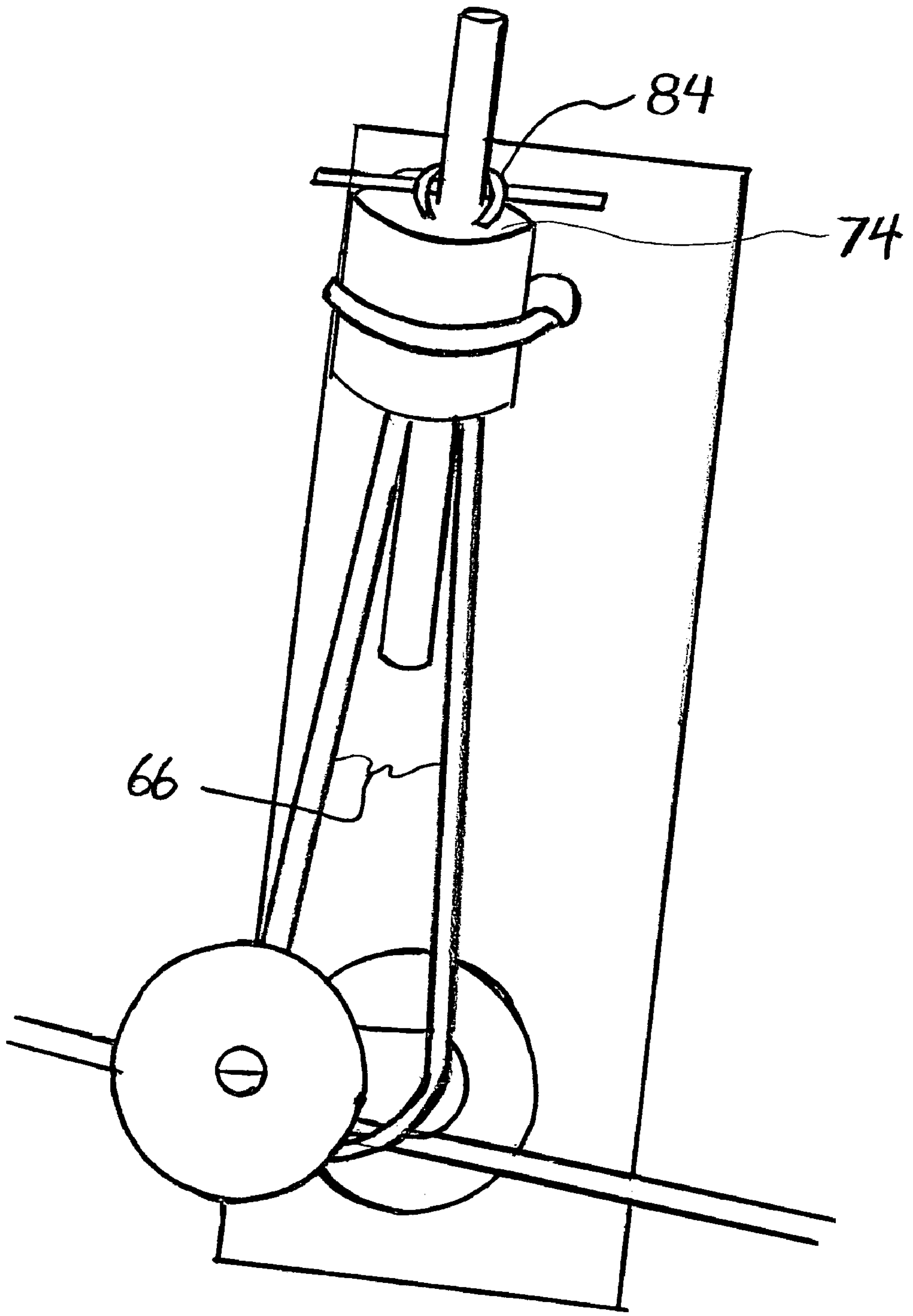
FIG. 7 is front perspective view of the attenuator of FIG. 6 in which a microbend is formed as a result of an external force on the fiber optic cable.
Figure 8:
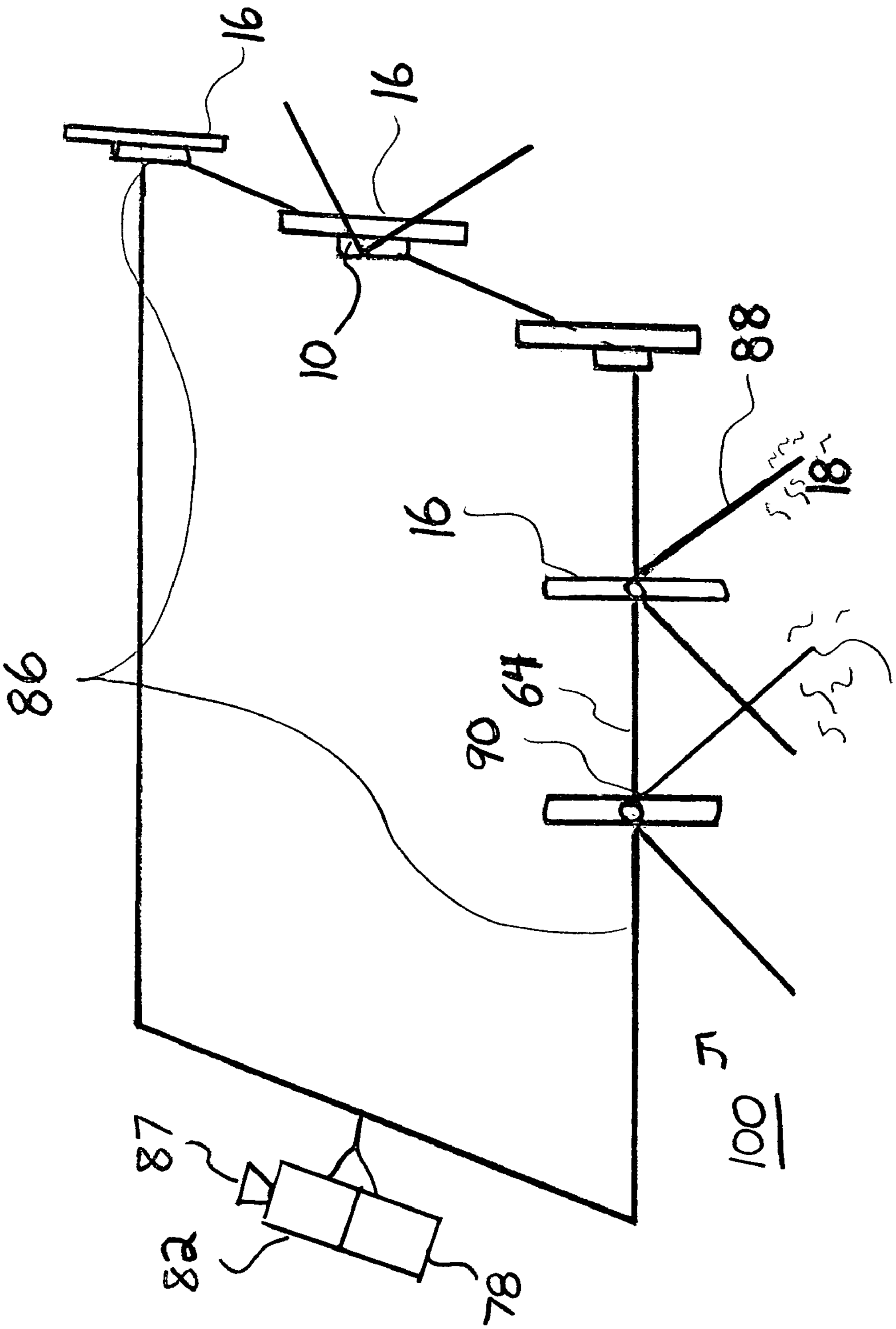
FIG. 8 is an elevational view of fiber optic cable based intrusion detection system of the present invention in accordance with the preferred embodiment.

When an external force is applied to the fiber optic cable 64, such as when an unwarranted intrusion is effected through the cable 64, the upper loop 72 in the fiber optic cable 64 diminishes to a microbend 84 about the lowered cross arm 70, depicted in FIG. 7.

This microbend 84 causes an attenuation to the light signal through the fiber optic cable 64. The drop in light intensity is measured at the second cable end 80, thus triggering an alarm signal which signifies an unauthorized intrusion.

To reset the fiber optic cable 64 to its original state, the retractable rod 80 is simply raised and lowered as previously described herein.

Sometimes it is necessary to adjust tension of the system so that an inconsequential force does not create a false alarm or that a substantial force does create an alarm. The first compressible member 36 provides the capability to adjust the tension of the fiber optic cable 64.

Quickly digressing, the fiber optic cable 64 is wrapped around the first compressible member 36. Thus, a frictional force exists between the first compressible member 36 and the fiber optic cable 64. The frictional force on the fiber optic cable 64 is greatest when the first compressible member 36 is in a non-compressed state. When the frictional force is the greatest a larger external force to the cable 64 is required to create the microbend 84.

To reduce the frictional force on the fiber optic cable 64, and increase the sensitivity of the system, the bolt 40 is tightened thereby compressing the first compressible member 36. Thus, the sensitivity of the attenuator 10 is set and adjusted simply by turning the bolt 40.

The goal of the present invention is to provide a quick set up system for monitoring unauthorized intrusions through a perimeter 86. In certain situations the fiber optic cable 64 alone can be bypassed, such as crawling underneath or leaping over, without making contact with the fiber optic cable 64.

It may therefore be desirable to increase the protection area about the perimeter 86. Trip wires 88, made from standard fishing line or other suitable material, are coupled to the fiber optic cable 64 at a first end 90 and staked in the earth 18 at a second end 92 to increase the area of protection.

A person trying to circumvent the fiber optic cable 64 will displace the trip wire 88 which in turn displaces the fiber optic cable 64, thereby creating the microbend 84 in the cable 64 and resulting alarm signal.

The primary feature of the present invention shall now be described in accordance with a functional description of the setup and operation of the present invention. With mobility being key component in today's security forces, it is often times necessary to quickly secure a perimeter for temporary storage of assets or manpower.

It is often imperative to protect these assets from theft or destruction. It is also desirable that the assets be quickly deployed to other locations.

The present invention allows the user to quickly install an electronic perimeter monitoring system 100 about any desirable area.

Support posts 16 are quickly set into the earth 18 at spaced intervals to define the perimeter 86. The portably mountable fiber optic cable attenuator 10 is mounted to each support post 16 or a natural structure, such as a tree or wall. The fiber optic cable 64 is installed about the perimeter 86 through each portably mountable fiber optic cable attenuator 10 as described herein. As previously described herein, the fiber optic cable 64 is connected at its first end 76 to the light source 78 and at its second end 80 to a light detector 82.

Also as previously described, an external force, whether directly on the fiber optic cable 64 or indirectly on the fiber optic cable 64 through the trip wire 88, creates a microbend 84 in the fiber optic cable 64 which causes an attenuation to the light signal through the fiber optic cable 64. This loss of light intensity through the fiber optic cable 64 is readily discerned by the light detector 82. An alarm signal is responsive to the loss of light intensity at the second cable end 80.

To increase the perimeter coverage 86 a number of trip wires 88 are installed to the fiber optic cable 64 as previously described.

Thus, the portable fiber optic cable based electronic intrusion detection system is completely provided in accordance with the present invention for perimeter that have no secure barrier, such as a fence. A quick field installable system includes a light source, a light detector integrated with an alarm, a plurality of field installable support posts and a plurality of portable fiber optic cable attenuators 10.

Any lay person quickly inserts the support posts into the earth 18. Then, the attenuators 10 are fabricated and installed onto each support post 16. The fiber optic cable is installed through each attenuator 10 and connected to the light source at the first cable end and to the light detector at the second cable end. Thus, the fiber optic cable based intrusion detection system is installed.

One of the advantages of the present invention is that the attenuator is comprised essentially of off of the shelf hardware. An installer can fabricate the attenuator even where some parts are missing by using common parts found at a hardware store Various changes and modifications, other than those described above in the preferred embodiment of the invention described herein will be apparent to those skilled in the art. While the invention has been described with respect to certain preferred embodiments and exemplifications, it is not intended to limit the scope of the invention thereby, but solely by the claims appended hereto.

What is claimed is:

1. A portable optical intrusion detection apparatus for detecting perimeter intrusion, said apparatus comprising:

a light source for transmitting a light signal;

at least one fiber optic cable optically connected at a first end to said light source;

at least one portably mounted cable attenuator, said attenuator including a first cable looping means which defines a first cable loop in said at least one fiber optic cable;

an upper cable loop setting means which defines an upper cable loop in said fiber optic cable adjacent to said first cable loop, wherein said upper cable loop has a first maximum effective diameter;

a cable loop stopping means which defines a predetermined minimum sized upper cable loop when said at least one fiber optic cable is subject to an external force, wherein said predetermined minimum sized upper cable loop includes a second maximum effective diameter that is smaller dimensioned than said first maximum effective diameter of said upper cable loop, wherein said upper cable loop remains fixed at said second effective diameter when said external force dissipates;

attenuator securing means for securing said at least one cable attenuator to a fixed structure;

light detecting means which receives and measures the intensity of said light signal at a second end of said at least one fiber optic cable; and alarm means responsive to said light detecting means, wherein said alarm means provides a detectable signal when the intensity of said light signal falls below a predetermined threshold.

2. The apparatus of claim 1, further including at least one artificial fixed structure.

3. The apparatus of claim 2, wherein said fixed structure further includes at least one support post which is anchored in the earth.

4. The apparatus of claim 1, wherein said first cable looping means further includes an adjustable tensioner which allows the capability of adjusting the frictional force on said fiber optic cable.

5. The apparatus of claim 4, wherein said adjustable tensioner further includes a compressible member, wherein said at least one fiber optic cable loops about said compressible member, and wherein said compressible member includes a coefficient of friction that varies with the compression of the compressible member.

6. The apparatus of claim 1, wherein said cable loop setting means further includes a retractable rod having a cross arm affixed thereto, wherein said upper cable loop is formed around said cross arm, such that said upper cable loop having said first sized dimension is formed when said retractable rod is in an extended position.

7. The apparatus of claim 6, wherein said cable loop stopping means further includes said retractable rod and cross arm in a retracted position.

8. The apparatus of claim 1, further including at least one trip wire affixed to said at least one fiber optic cable.

9. An automatic fiber optic cable light signal mechanical attenuation apparatus, wherein a light signal becomes attenuated when an external force is applied to at least one fiber optic cable through which said light signal passes, said apparatus comprising:

a first cable looping means which defines a first cable loop in said at least one fiber optic cable;

an upper cable loop setting means which defines an upper cable loop in said fiber optic cable adjacent to said first cable loop, wherein said upper cable loop has a first maximum effective diameter; and a cable loop stopping means which defines a predetermined minimum sized upper cable loop when said at least one fiber optic cable is subject to an external force, wherein said predetermined minimum sized upper cable loop includes a second maximum effective diameter that is smaller dimensioned than said first maximum effective diameter of said upper cable loop, wherein said upper cable loop remains fixed at said second effective diameter when said external force dissipates.

10. The apparatus of claim 9, further including a substrate which supports said first cable looping means and said upper cable loop setting means, said substrate including an obverse surface.

11. The apparatus of claim 10, wherein said first cable looping means further includes an annular member having a central axis that is perpendicularly situate to said obverse surface of said substrate.

12. The apparatus of claim 11, further including an adjustable tensioning means, wherein said annular member is a compressible material having an undeformed first length, and wherein said annular member includes a pair of radial ends, and wherein a compression means disposed across said radial ends allows compression of the first length, thereby decreasing the coefficient of friction of the radial surface of the annular member.

13. The apparatus of claim 9, further including a cable loop separation means, wherein said cable loop separation means further includes a cable guiding member having at least one opening disposed there through, and wherein said first cable loop is threaded through said at least one opening, thereby separating said upper cable loop from said first cable loop.

14. The apparatus of claim 9, wherein said cable setting means further includes a retractable rod having a cross arm affixed thereto, wherein said upper cable loop is formed around said crossarm, such that said upper cable loop having said first sized set dimension is formed when said retractable rod is in an extended position.

15. The apparatus of claim 14, wherein said upper cable loop setting means further includes a cable guiding member having at least one opening disposed there through, and wherein said retractable rod is frictionally secured through said at least one opening.

* * * * *